United States Patent [19]

Mizusawa

[11] Patent Number: 4,743,370
[45] Date of Patent: May 10, 1988

[54] FILTER FOR FUEL TANK

[75] Inventor: Akira Mizusawa, Yokohama, Japan

[73] Assignee: Nifco Inc., Yokohama, Japan

[21] Appl. No.: 946,811

[22] Filed: Dec. 29, 1986

[30] Foreign Application Priority Data

Jan. 17, 1986 [JP] Japan ................ 61-3964[U]

[51] Int. Cl.[4] ............................. B01D 35/02
[52] U.S. Cl. .................... 210/168; 210/172; 210/460
[58] Field of Search ............ 210/172, 232, 416.4, 210/438, 460, 461, 463, 485, 168, 171, 486; 55/373, 374, 379

[56] References Cited

U.S. PATENT DOCUMENTS

| 3,108,065 | 10/1963 | McMichael | 210/172 |
| 3,826,372 | 7/1974 | Bell | 210/460 |
| 3,833,124 | 9/1974 | Sugiyama et al. | 210/460 |
| 3,875,059 | 4/1975 | Maschino | 210/460 |
| 3,881,451 | 5/1975 | Benner et al. | 210/172 |
| 4,204,960 | 5/1980 | Sugiyama et al. | 210/438 |
| 4,411,788 | 10/1983 | Kimura | 210/460 |
| 4,420,396 | 12/1983 | Yamamoto et al. | 210/460 |
| 4,523,992 | 6/1985 | Sackett | 210/463 |
| 4,561,977 | 12/1985 | Sasaki | 210/416.4 |
| 4,589,986 | 5/1986 | Greskovics et al. | 55/374 |
| 4,618,422 | 10/1986 | Sasaki et al. | 210/416.4 |

FOREIGN PATENT DOCUMENTS 59-162354 9/1984 Japan .

Primary Examiner—Richard V. Fisher
Assistant Examiner—Richard D. Jordan
Attorney, Agent, or Firm—Trexler, Bushnell, Giangiorgi & Blackstone, Ltd.

[57] ABSTRACT

A fuel tank filter comprises a sack-like filter net member, a mounting member for mounting the net member on a suction pipe and a mounting cover for mounting an opening of the net member on the mounting member.

2 Claims, 3 Drawing Sheets

FIG. I
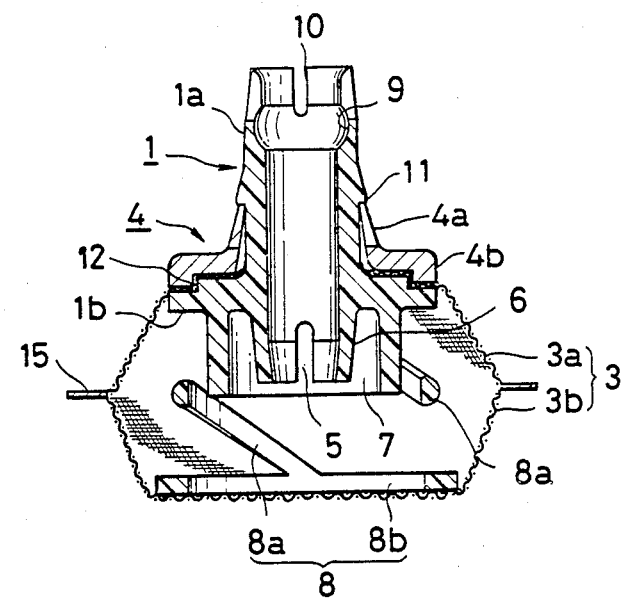
FIG. 2
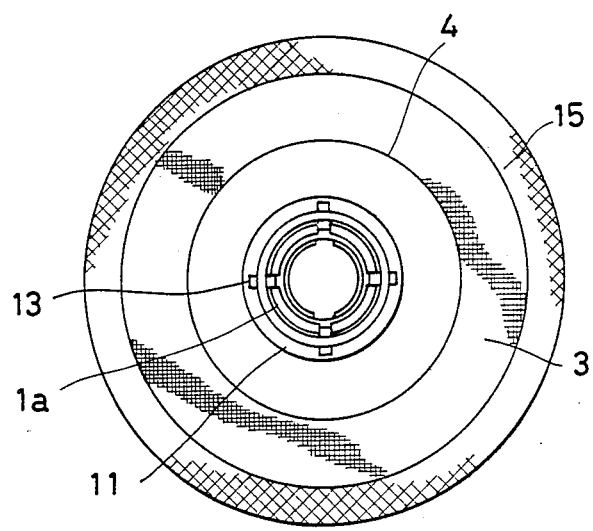

FILTER FOR FUEL TANK

FIELD OF THE INVENTION AND RELATED ART STATEMENT

This invention relates to a filter for mounting on the end of a suction pipe inserted into a fuel tank, e.g. a gasoline tank, of an automobile for filtering impurities, e.g. dirt, ice crystals. etc., from the fuel being withdrawn into the suction pipe.

A filter is usually mounted on the suction pipe inserted into a gasoline tank of an automobile or the like for preventing the withdrawal of impurities.

Heretofore, filters consisting of corrosion resistant metal nets have been used for this purpose. These filters, however, are inferior in manufacturability and high in cost. Therefore, many automobiles now use a filter which consists of a synthetic resin frame molded with a metal or synthetic resin net member as an insert.

Examples of filters consisting of a synthetic resin molding are disclosed in Japanese Utility Model Publications SHO 52-37915, SHO 53-42840 and SHO 55-55784.

In these proposed filters, unlike earlier filters which had a metal frame assembled as a body, the frame itself is made of a synthetic resin. In addition, means for fastening the net member is provided when molding the frame, or the frame is molded with this means as an insert, thus simplifying the fastening operation and enhancing the manufaturability.

This synthetic resin filter is, however, still unsatisfactory in view of manufacturability, and improvements in this connection have been desired. More specifically, in the manufacture of the prior art synthetic resin filter, a substantially cylindrical synthetic resin frame is molded with a net member as an insert so that the net is held in a predetermined shape to provide the filter function. The manufacture of this filter, however, requires a step of molding the frame integrally with the net member.

OBJECT AND SUMMARY OF THE INVENTION

An object of the invention is to provide a fuel tank filter with improved manufacturability, which can be manufactured inexpensively.

Another object of the invention is to provide a filter which has a substantially increased effective filtering area.

A still further object of the invention is to provide a filter having flexibility, which does not suffer a reduction of filter function when it is deformed, and which has a very long service life.

To attain the above objects of the invention, there is provided a fuel tank filter comprising a sack-like net member, a mounting member for fastening the net member to a suction pipe, and a mounting cover for attaching an opening of the net member to the mounting member, the mounting member including a cylindrical mounting portion having a locking portion formed on the outer periphery thereof and a flange-like fastening portion, the mounting cover including a cylindrical lock portion fitted on the mounting portion and engaged with the locking portion and a clamping portion brought into contact with the fastening portion, the net member being undetachably mounted on the mounting member by passing the opening of the net member about the mounting portion to be put on the upper surface of the fastening portion, then fitting the lock portion of the mounting cover on the mounting portion to superpose the clamping portion on the opening of the net member, thereby clamping the opening of the net member between the lower surface of the clamping portion and the upper surface of the fastening portion and, at the same time, engaging an opening of the lock portion with the locking portion.

The filter having the above construction is mounted on an end of a suction pipe through the mounting member and inserted into a fuel tank. With this filter, the net member can be mounted on the mounting member by inserting the opening of the net member about the mounting portion of the mounting member and fitting the mounting cover on the mounting member to clamp the net member between the clamping portion and the fastening portion, and the fitted mounting cover is engaged with the locking portion of the mounting member to prevent detachment of the mounting cover and maintain the opening of the net member in the clamped state.

The above and other objects and features of the invention will become more apparent from the following detailed description with reference to the accompanying drawings.

BRIEF DESCRIPTION OF THE DRAWINGS

FIG. 1 is an axial sectional view showing an embodiment of the filter for a fuel tank according to the invention;

FIG. 2 is a plan view of the filter shown in FIG. 1;

DETAILED DESCRIPTION OF THE PREFERRED EMBODIMENTS

Figure 3:
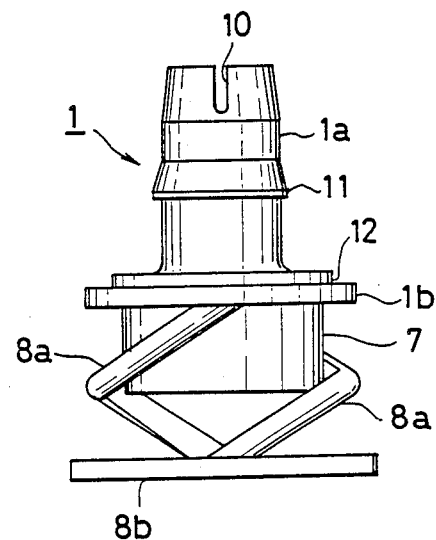
FIG. 3 is a front view showing a mounting member of the filter shown in FIG. 1.
Figure 4:
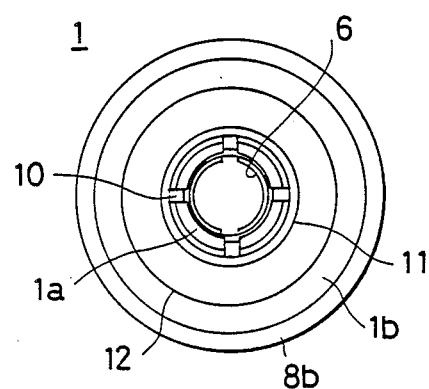
FIG. 4 is a plan view of the mounting member shown in FIG. 3.
Figure 5:
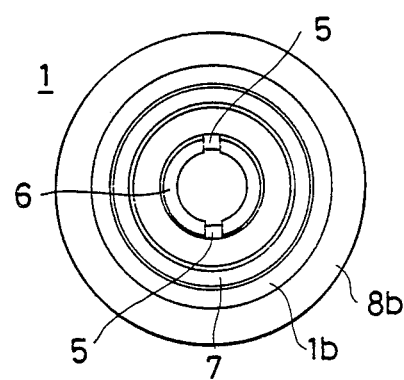
FIG. 5 is a bottom view of the mounting member shown in FIG. 3.
Figure 7:
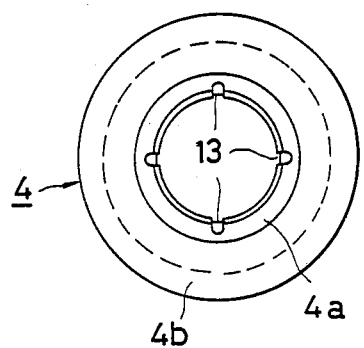
FIG. 7 is a plan view showing a mounting cover of the filter shown in FIG. 1.

The drawings show one embodiment of the fuel tank filter according to the invention. Referring to FIGS. 1 to 7, reference numeral 1 designates a mounting member mounted on an end of a suction pipe 2 inserted into a fuel tank, numeral 3 a net member attached to the mounting member so as to surround the end of the suction pipe 2, and numeral 4 a mounting cover for fastening the net member to the mounting member 1.

The mounting member is made of a synthetic resin. In this embodiment, the mounting member is constituted integrally of a cylindrical mounting portion 1a to be fitted on the suction pipe 2 and a fastening portion 1b projecting like a flange from the outer periphery of the lower end of the mounting portion for attaching the net member 3. The mounting member 1 also has a squeezing portion 6 having axial slits 5, a cylindrical protective portion 7 surrounding the squeezing portion 6 and a shape retaining member 8 surrounding and extending downwardly of the protective portion 7.

Figure 6:
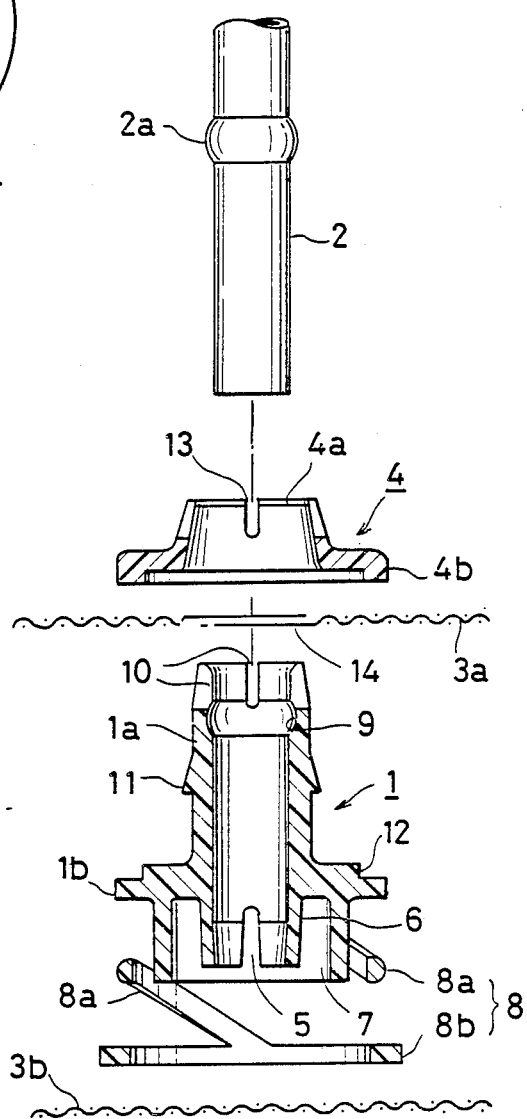
FIG. 6 is an exploded front view, partly in section, of the filter shown in FIG. 1.

The mounting portion 1a has an inner diameter matched to the outer diameter of the suction pipe 2. Its inner periphery is formed near the upper end with an annular recess 9 for receiving an annular raised portion 2a of the suction pipe 2 to prevent detachment (FIG. 6). Its upper open end portion is reduced in thickness and is formed with a plurality of axial slits 10 to facilitate the insertion of the suction pipe 2. Its outer periphery is formed at an axially intermediate portion with an annular locking portion 11 for locking the mounting cover 4.

The fastening portion 1b has a stepped upper portion 12 for holding an open portion of the net member 3. The squeezing portion 6 and the protective portion 7 concentrically surrounding the squeezing portion 6 depend from a central portion of the bottom of the fastening portion 1b.

The shape retaining member 8 serves to retain the net member 3 in an expanded state from the inside thereof when the net member is attached to the mounting member 1. In this embodiment, the shape retaining means 8 has two elastic arm portions 8a extending helically from the bottom of the fastening portion 1b so as to surround the protective portion 7 and a ring member 8b spaced apart and parallel to the fastening portion 1b.

Normally, the arm portions 8a of the shape retaining member 8 are in a non-contracted state so as to hold the ring member 8b below the protective portion 7. When an upward force is exerted on the ring member 8b, the arm portions are contracted so that the ring member 8b rises, at maximum up to the outer periphery of the protective portion 7. Further, when a sidewise external force is exerted on the ring member 8b, the arm portions 8a are flexed sidewise so that the ring member 8b is displaced sidewise from the position directly beneath the fastening portion 1b.

The mounting cover 4 is made of a thermoplastic synthetic resin having rigidity and elasticity like those of the mounting member 1. In the embodiment shown in FIG. 7, the cover member 4 is substantially disk-like and is fitted to the shape of the fastening portion 1b. It has a central cylindrical lock portion 4a projecting upwardly and a skirt-like clamping portion 4b downwardly extending from its outer edge. The lock portion 4a has a size suitable for fitting on the mounting portion 1a. Its thickness is reduced toward the upper end for enhanced flexibility. Further, it is provided with a plurality of axial slits 13 to provide spring action. The clamping portion 4b has an inner diameter sufficient to surround the stepped portion 12 of the fastening portion 1b, and has an axial dimension equal to the height of the stepped portion.

The net member 3 will now be described. In this embodiment, the net member 3 consists of two sheet-like synthetic resin net elements 3a and 3b, which are fused together along their edges into the form of a sack.

FIG. 6 shows the net elements 3a and 3b before formation of the net member 3. Referring to this figure, the net element 3a is formed with a hole 14. The hole 14 is fitted on the mounting portion 1a of the mounting member 1 such that the net element 3a extends along the top surface of the fastening portion 1b.

Then, the mounting cover 4 is passed on the mounting portion 1a so as to cover the net element 3a. At this time, the constricted upper end of the cover 4 is forcibly passed to clear the locking portion 11 of the mounting portion 1a. As a result, the mounting cover 4 is locked on the locking portion 11. Thus, a portion of the net member 3a surrounding the hole 14 is clamped between the clamping portion 4b and fastening portion 1b with the stepped portion 12.

After the net element 3a has been mounted on the mounting member 1 with the fitting of the mounting cover 4, the other net element 3b is laid on a flat surface, and the shape retaining member 8 of the mounting member is pressed against the net element 3b from above, causing the shape retaining member 8 to contract. In this state, the net element 3a mounted earlier is laid over the net element 3b. Then the overlapped net elements 3a and 3b are thermally fused together along their edges at positions along a circle surrounding the shape retaining member 8. The portions of the net elements outside the fused portion 15 are cut away, thus forming the sack-like net member 3.

FIG. 1 shows the filter after the net member 3 has been formed and the retaining member 8 has been returned to its normal state by the spring force of the arm portions 8a. The net member, which has been formed by fusing together two net elements, is expanded into the form of a sack and provides the function of a filter.

The mounting member and mounting cover are made of a synthetic resin to assure moldability and corrosion resistance.

A filter having the construction of one of the embodiments of the invention described in the foregoing, is mounted on an end of the suction pipe 2 inserted in a fuel tank so as to be at a predetermined position in the tank. To mount the filter on the pipe, the end of the pipe is forcibly inserted into the mounting portion 1a of the mounting member to fit the annular raised portion 2a in the recess 9. At the same time, the open top of the mounting member is brought into close contact with the pipe periphery, and the end of the pipe is passed through the squeezing portion 6, whereby the filter is securely mounted.

The filter having the above construction according to the invention thus can be readily and reliably secured to the suction pipe. In addition, unlike the case of the prior art filter, the net member secured to the mounting member is not inserted in a support frame, but its entire surface is exposed for filtering. Thus, the effective filtering area can be used most efficiently. Further, it is possible to reduce the size compared with the prior art filter.

According to the present invention, the net member can be fixed by inserting the opening of the net member about the mounting portion of the mounting member and pressing the net member against the fastening portion by means of the mounting cover to be mounted on the mounting member and the mounting cover can be fixed by causing the lock portion thereof to clear the locking portion of the mounting member and to engage the locking portion by its elastic restoring force. Thus, the operation can be executed with exactitude and the workability can effectively be enhanced.

In order for the net member to be fixed with more exactitude, the fastening portion of the mounting member is formed to have a stepped portion as in the aforementioned embodiment, thereby engaging the clamping portion of the cover member with the stepped portion while interposing the net member therebetween.

Obviously, many variations and modifications of the present invention can be made based on the above teachings. It is therefore to be understood that within the scope of the appended claims, the present invention may be practiced otherwise than as specifically described herein.

What is claimed is:

1. A fuel tank filter comprising: a sack-like net member having an opening, a mounting member for mounting said net member on a suction pipe, shape-retaining means extending from said mounting member and engagable with said net member to prevent collapse thereof into said mounting member, said mounting member including a cylindrical mounting portion provided on the peripheral surface thereof with a locking portion and a flange-like fastening portion, and a mounting cover for mounting said opening of said net member on said mounting member, said mounting cover including a cylindrical lock portion fitted on said mounting portion and engaged with said locking portion and a clamping portion brought into contact with the upper surface of said fastening portion, said net member being undetachably mounted on said mounting member by passing said opening of said net member about said mounting portion to be put on the upper surface of said fastening portion, then fitting said lock portion on said mounting portion to superpose said clamping portion on said opening of said net member in clamping relation therewith, thereby clamping said opening of said net member between the lower surface of said clamping portion and the upper surface of said fastening portion and, at the same time, engaging an opening of said lock portion with said locking portion.

2. The fuel tank filter according to claim 1, wherein said filter net member comprises two synthetic resin net elements fused together along the edge thereof.

* * * * *